(12) United States Patent
Maeda et al.

(10) Patent No.: US 8,313,251 B2
(45) Date of Patent: Nov. 20, 2012

(54) OPTICAL TRANSCEIVER AND PROJECTION COVERING MEMBER

(75) Inventors: Fumihide Maeda, Odawara (JP); Taichi Kogure, Kamakura (JP)

(73) Assignee: Opnext Japan, Inc., Kanagawa (JP)

( * ) Notice: Subject to any disclaimer, the term of this patent is extended or adjusted under 35 U.S.C. 154(b) by 692 days.

(21) Appl. No.: 12/413,793

(22) Filed: Mar. 30, 2009

(65) Prior Publication Data

US 2010/0074574 A1    Mar. 25, 2010

(30) Foreign Application Priority Data

Apr. 18, 2008    (JP) .................................. 2008-108491

(51) Int. Cl.
*G02B 6/36*    (2006.01)
(52) U.S. Cl. ............... 385/92; 385/89; 385/94
(58) Field of Classification Search ............ 385/88, 385/89, 92, 94
See application file for complete search history.

(56) References Cited

U.S. PATENT DOCUMENTS 7,452,139 B2 *   11/2008   Wang et al. ................... 385/92
2007/0140621 A1    6/2007   DeCusatis et al.

FOREIGN PATENT DOCUMENTS

| JP | 3-6611 U | 1/1991 |
|---|---|---|
| JP | 7-196918 A | 8/1995 |
| JP | 2002-365491 A | 12/2002 |
| JP | 2003-304207 A | 10/2003 |
| JP | 2004-126269 A | 4/2004 |
| JP | 2007-171947 A | 7/2007 |

* cited by examiner

*Primary Examiner* — Kevin S Wood
(74) *Attorney, Agent, or Firm* — Mattingly & Malur, P.C.

(57) ABSTRACT

An optical transceiver has a projection covering member that can suppress EMI noise radiated from a pig-tail part. An elastic covering member covers a projection which includes an optical coupler of an optical sub assembly. The covering member is made of a conductive elastic material having a predetermined resistivity. At least a part of an outer circumference surface of the elastic covering member comes into intimate contact with an outer periphery of a conductive opening part of a case for the optical transceiver while an inner circumference surface of the elastic covering member comes into intimate contact with the projection.

16 Claims, 3 Drawing Sheets

US 8,313,251 B2

OPTICAL TRANSCEIVER AND PROJECTION COVERING MEMBER

CROSS-REFERENCE TO RELATED APPLICATION

The present application claims priority from Japanese application JP 2008-108491 filed on Apr. 18, 2008, the content of which is hereby incorporated by reference into this application.

BACKGROUND OF THE INVENTION

1. Field of the Invention

The present invention relates to an optical transceiver and a projection covering member. In particular, the present invention relates to a technique for suppressing electromagnetic interference (EMI).

2. Description of the Related Art

In recent years, the optical transmission speed of an optical transceiver has changed from 2.5 Gbit/s to 10 Gbit/s and further to 40 Gbit/s. Therefore, an internal clock frequency of a circuit used for optical communication or the like has also increased to be from several hundred MHz to several tens of GHz. In connection with that, the frequency of the EMI has also increased to be several tens of GHz. In particular, it is an urgent necessity to establish a technique for suppressing the EMI at the upper limit frequency of 40 GHz and its vicinity because of a Federal Communications Commission (FCC) regulation that is an EMI regulation in the U.S.A.

In addition, to respond to a request for improving mounting efficiency of the optical transceiver that has been compact and downsized, a so-called pigtail type has become a common structure of the optical transceiver and in which pigtail type, a projection, which includes an optical coupler of an optical subassembly, protrudes to the outside of a case.

However, with respect to such a pigtail type optical transceiver, electromagnetic wave or noise current may occur in the printed circuit board or in the optical subassembly and may propagate through the projection protruding to the outside of the case so as to reach the outside of the case, which becomes a factor in generating the EMI.

Concerning this point, JP 2003-304207 A (hereinafter referred to as "Patent Document 1") and JP 2002-365491 A (hereinafter referred to as "Patent Document 2") disclose techniques for suppressing the EMI radiated from such a pigtail part of the optical transceiver.

Specifically, Patent Document 1 discloses an optical module having a metal cap that contacts with a lower case part and an upper case part or is integral with the case so as to further cover the protruding part of a projection which includes an optical coupler covered with an elastic member. In addition, Patent Document 2 discloses an optical module having a projection which includes an optical coupler covered with an electromagnetic wave absorber.

However, the optical module described in Patent Document 1 only shields the EMI radiated from the protruding part of the projection covered with the elastic member on the outside thereof, but it cannot provide an effect of attenuating the noise current (noise magnetic field) generated in the projection. Therefore, there is a problem that the electromagnetic wave may leak from a slight gap in the case.

In addition, the electromagnetic wave absorber described in Patent Document 2 cannot provide a sufficient effect of absorbing the electromagnetic wave of the EMI having a frequency of approximately several tens of GHz to 40 GHz generated by the optical subassembly. In addition, there is a problem that the effect of suppressing the EMI generated by other components constituting the optical module is also insufficient.

SUMMARY OF THE INVENTION

The present invention has been made in consideration of the above-mentioned conventional problems, and an object thereof is to provide an optical transceiver and a projection covering member that can suppress EMI noise radiated from a pigtail part.

In order to achieve the above-mentioned object, according to the present invention, there is provided an optical transceiver including: an optical subassembly having a main body part for housing a semiconductor optoelectronic device and a projection which includes an optical coupler for optically coupling an optical fiber inserted externally to the semiconductor optoelectronic device; a printed circuit board on which a circuit connected to the semiconductor optoelectronic device via a signal transmission line is mounted; a covering member for covering the projection; and a conductive case for housing the optical subassembly and the printed circuit board, the conductive case having an opening part through which the projection covered with the covering member passes from inside to outside. At least an outer circumference surface and an inner circumference surface of the covering member are made of a conductive elastic material having predetermined resistivity. At least a part of the outer circumference surface of the covering member comes into intimate contact with an entire outer periphery or with a part of an outer periphery of the opening part, and an entire inner circumferential surface or a part of the inner circumference surface of the covering member comes into contact with the projection.

In the present invention, the conductive elastic material for covering the projection contacts intimately the outer periphery of the opening part of the conductive case, and hence it is possible to shield the high-frequency electromagnetic wave radiated from the optical subassembly or the printed circuit board. In addition, the projection is covered with the conductive material having predetermined resistivity and contacts at least a part of the conductive material, and hence the noise current (noise magnetic field) itself generated in the projection can be attenuated by heat consumption. Therefore, according to the present invention, the EMI noise radiated from the pigtail part of the optical transceiver (part of the projection protruding from the case) can be suppressed.

Further, in one aspect of the present invention, a surface of the projection is made of a metal.

Further, in one aspect of the present invention, the elastic material is a conductive rubber.

In this aspect, volume resistivity of the elastic material may be 10 ohm·cm or lower. Further, the elastic material may be a millable silicone rubber. Further, the elastic material may contain conductive filler made of carbon black.

Further, in one aspect of the present invention, a length of a part of the outer periphery of the opening part that does not contact with the outer circumference surface of the covering member is 2.5 mm or smaller.

Further, in one aspect of the present invention, a thickness of the covering member is 0.5 mm or larger.

Further, according to the present invention, there is provided a projection covering member for covering a projection which includes an optical coupler of an optical transceiver including: an optical subassembly having a main body part for housing a semiconductor optoelectronic device and the projection for optically coupling an optical fiber inserted externally to the semiconductor optoelectronic device; a printed circuit board on which a circuit connected to the semiconductor optoelectronic device via a signal transmission line is mounted; and a conductive case for housing the optical subassembly and the printed circuit board, the conductive case having an opening part through which the projection passes from inside to outside. At least an outer circumference surface and an inner circumference surface of the projection covering member are made of a conductive elastic material having predetermined resistivity. At least a part of the outer circumference surface of the projection covering member comes into intimate contact with an entire outer periphery or with a part of the outer periphery of the opening part, and an entire inner circumference surface or a part of the inner circumference surface of the projection covering member contacts the projection.

According to the present invention, the conductive elastic material for covering the projection contacts intimately with the outer periphery of the opening part of the conductive case. Therefore, it is possible to shield the high-frequency electromagnetic wave radiated from the optical subassembly or the printed circuit board. In addition, the projection is covered with the conductive material having predetermined resistivity and contacts at least a part of the conductive material. Therefore, the noise current (noise magnetic field) itself generated in the projection can be attenuated by heat consumption. Thus, the EMI noise radiated from the pigtail part of the optical transceiver (the part of the projection protruding from the case) can be suppressed.

In addition, it is not necessary to cover the projection with a metal cap that contacts a lower case part and an upper case part or that is integral with the case. Therefore, a sufficient bending radius of an optical fiber can be maintained even if the optical fiber is pulled in a direction different from the insertion and withdrawal direction. Therefore, it is possible to prevent a breakage of the optical fiber at an optical fiber through-hole or in its vicinity, to prevent a breakage of a sheath of the optical fiber because of a contact between the optical fiber and the metal cap, and other problems. Further, a metal cap, that has a complicated shape and that needs a number of assembling steps, is not necessary, and hence it is also possible to prevent an increase in manufacturing cost.

DETAILED DESCRIPTION OF THE INVENTION

Hereinafter, an embodiment of the present invention is described in detail with reference to the drawings.

Figure 1:
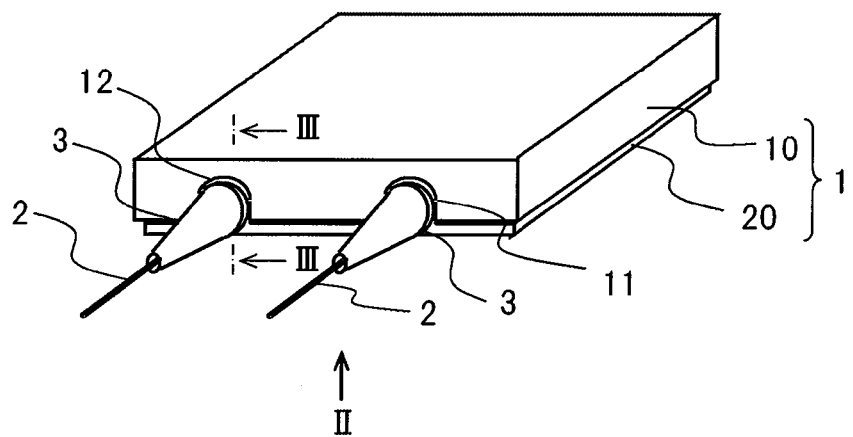
FIG. 1 is an upper perspective view of an optical transceiver according to an embodiment of the present invention.

FIG. 1 is an upper perspective view of an optical transceiver according to an embodiment of the present invention. The optical transceiver according to this embodiment includes a case 1 made up of an upper case part (first case part) 10 and a lower case part (second case part) 20 that are made of conductive metal and are engaged with each other as illustrated in FIG. 1. The case 1 has opening parts 11 and 12 through which a projection which includes an optical coupler (that is described later) and an elastic covering member 3 pass from the inside to the outside of the case. An optical fiber 2 is externally inserted in the projection, and the elastic covering member 3 covers the projection so as to protect the projection.

Figure 2:
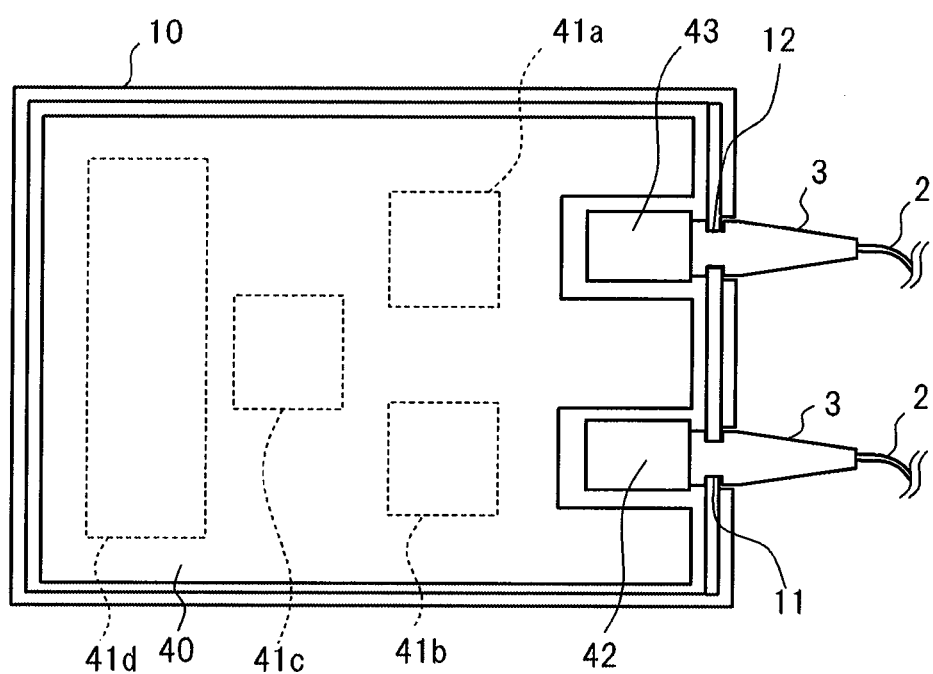
FIG. 2 is a view of the optical transceiver illustrated in FIG. 1 viewed in a direction of arrow II in a state in which a lower case part is removed.

FIG. 2 is a view of the optical transceiver illustrated in FIG. 1 viewed in a direction of arrow II in the state in which the lower case part 20 is removed. As illustrated in FIG. 2, the case 1 houses optical subassemblies 42 and 43, and a printed circuit board 40 on which circuit components 41a to 41d are mounted. The circuit components 41a to 41d are connected to signal terminals of the optical subassembly 42 or 43 via a signal transmission line (not shown) for transmitting a high-frequency signal. In addition, the elastic covering members 3, each having a groove structure for engaging with the shape of the opening parts 11 and 12, are disposed at the opening parts 11 and 12 of the case 1.

Figure 3:
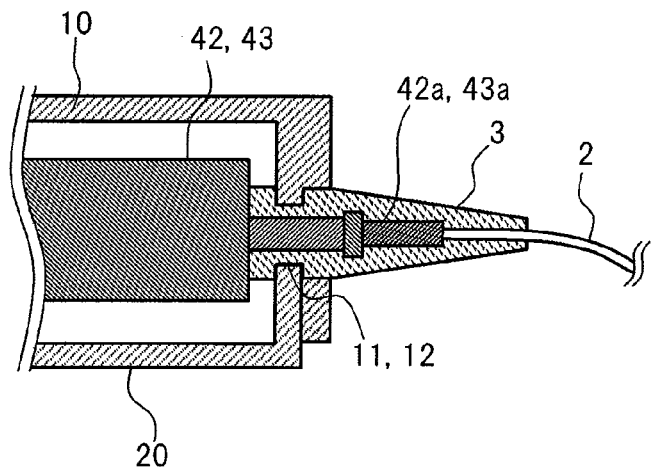
FIG. 3 is a partial cross-sectional view of the optical transceiver illustrated in FIG. 1 taken along the line of FIG. 1.

FIG. 3 is a partial cross-sectional view of the optical transceiver illustrated in FIG. 1 taken along the line of FIG. 1. As illustrated in FIG. 3, the optical subassemblies 42 and 43 include a main body part housing a semiconductor optoelectronic device such as a semiconductor laser diode or a photodiode, and projections 42a and 43a housing an optical coupler, a condenser lens, an optical isolator, and the like, so as to couple the optical fiber 2 inserted externally to the semiconductor optoelectronic device optically. The projections 42a and 43a have a surface made of an electric conductor (metal for the most part) and a cylindrical shape or a combined shape of a plurality of cylinders.

Figure 4:
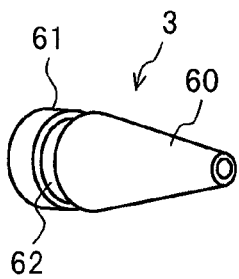
FIG. 4 is a perspective view illustrating an example of an elastic covering member for covering a projection which includes an optical coupler.
Figure 5:
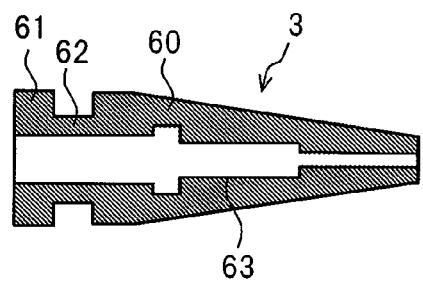
FIG. 5 is a center longitudinal cross-sectional view of the elastic covering member illustrated in FIG. 4.

FIG. 4 is a perspective view illustrating an example of the elastic covering member 3 for covering the projections 42a and 43a. FIG. 5 illustrates a center longitudinal cross section of the elastic covering member 3 illustrated in FIG. 4. As illustrated in FIGS. 4 and 5, the elastic covering member 3 includes a fixing part 61, a groove part 62, and a tip part 60, all of which are made of a conductive elastic material having a predetermined resistivity. In addition, a cavity 63 is formed in the elastic covering member 3.

The tip part 60 of the elastic covering member 3 has a structure which is configured for protecting both a tip part of the projection 42a or 43a and a part of the optical fiber 2 that is inserted into the projections 42a and 43a mainly from an external stress. A thickness of the tip part 60 is adapted so that even if a fiber side-pull maximum tension is applied to the optical fiber 2, a radius of curvature thereof is maintained as a minimum bending radius or larger. Therefore, a breakage of the optical fiber 2 and deterioration of light intensity can be prevented.

Figure 6:
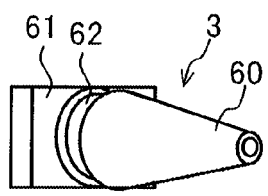
FIG. 6 is a perspective view illustrating an example of the elastic covering member for protecting the projection.

The fixing part 61 of the elastic covering member 3 has a structure that is configured for preventing the elastic covering member 3 from dropping off from the case 1 when the groove part 62 of the elastic covering member 3 is engaged with the opening part 11 or 12 of the case 1. Therefore, the fixing part 61 of the elastic covering member 3 may have any shape as long as it can prevent the elastic covering member 3 from dropping off from the case 1. For instance, the fixing part 61 may have the shape as illustrated in FIG. 6.

The groove part 62 of the elastic covering member 3 has a diameter that is substantially the same as, or that is a little smaller than a diameter of the opening parts 11 and 12 of the case 1. When the groove part 62 is engaged with the opening part 11 or 12, the groove part 62 comes into intimate contact, and thus into electric connection with the entire circumference or with nearly the entire circumference of the outer periphery of the opening part 11 or 12. Thus, the optical subassemblies 42 and 43 and the circuit components 41a to 41d mounted on the printed circuit board 40 are covered with the metal case 1 and with the conductive elastic covering member 3 substantially with no gap. Therefore, high-frequency electromagnetic waves emitted from the components can be shielded.

The cavity 63, which is formed in the elastic covering member 3, has a diameter that is substantially the same as, or that is a little smaller than a diameter of the projections 42a and 43a. When the projection 42a or 43a is inserted in the cavity 63, the entire surface or nearly the entire surface of the outer periphery of the projection 42a or 43a contacts with, and is electrically connected to, the inner circumference surface of the elastic covering member 3. Thus, the projections 42a and 43a contact the conductive elastic covering member 3 having predetermined resistivity and are covered therewith. Therefore, the noise current (noise magnetic field) itself generated in the projections 42a and 43a can be attenuated by heat consumption.

Note that a conductive rubber is suitable for the material of the elastic covering member 3. For instance, a conductive millable silicone rubber or the like is suitable, and a platinum catalyzed millable silicone rubber, having a volume resistivity of 5 ohm·cm and a type A hardness of 60, is particularly suitable as an existing material in which carbon black is mixed as a conductive filler.

If the above-mentioned millable silicone rubber having the volume resistivity of 5 ohm·cm and a conductivity of 20 S/m, is used for the elastic covering member 3, a skin depth of the electromagnetic wave is 0.56 mm at 40 GHz and is 1.13 mm at 10 GHz. Therefore, if the thickness of the elastic covering member 3 is approximately 2 mm, for example, it is possible to obtain a shielding effect of 30 dB or higher at 40 GHz and 15 dB or higher at 10 GHz. If the thickness is approximately 1 mm, it is possible to obtain a shielding effect of 25 dB or higher at 40 GHz and 10 dB or higher at 10 GHz. If the thickness is approximately 0.5 mm, it is possible to obtain a shielding effect of approximately 20 dB at 40 GHz and approximately 5 dB at 10 GHz. In other words, if the thickness of the elastic covering member 3 is 0.5 mm or larger, a sufficient shielding effect can be obtained.

No metal filler is mixed in the above-mentioned millable silicone rubber nor is any halide included in the same, and hence there is no risk of a short circuit or of corrosion of the circuit due to a fall of metal filler, or deoxidation, dehalogenation or the like due to the halide. Therefore, the millable silicone rubber is also superior in an aspect of securing safety and reliability, and in an aspect of corrosion resistance.

Next, it will be assumed that a slight gap may appear between the groove part 62 of the elastic covering member 3 and the opening parts 11 and 12 of the case 1.

Figure 7:
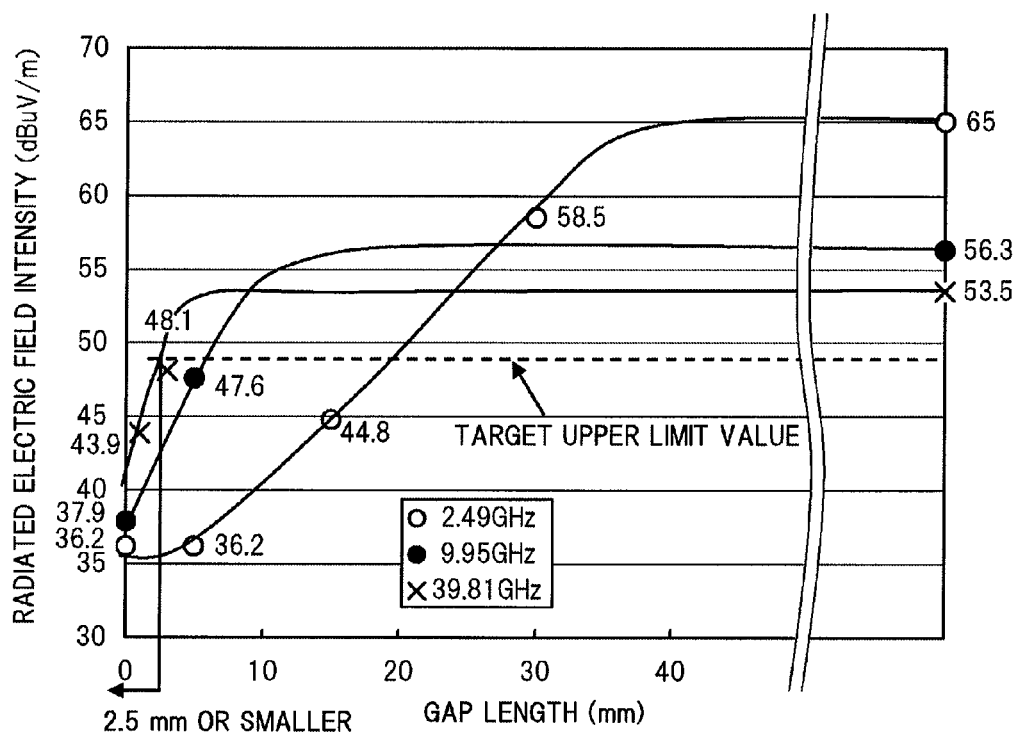
FIG. 7 is a graph illustrating a relationship between a length of a part in which a groove part of the elastic covering member for protecting the projection does not contact with an opening part of the case (a gap length) and radiated electric field intensity.

FIG. 7 is a graph illustrating a relationship between a length of the part in which the groove part 62 of the elastic covering member 3 does not contact with the opening parts 11 and 12 of the case 1, and which is hereinafter referred to as "gap length", and a radiated electric field intensity. In the graph, the horizontal axis represents the gap length (mm) between the groove part 62 of the elastic covering member 3 and the opening parts 11 and 12 of the case 1, and the vertical axis represents the radiated electric field intensity (dBµV/m).

Here, results of experiments using the electromagnetic waves having frequencies of 2.49 GHz, 9.95 GHz, and 39.81 GHz are illustrated.

As illustrated in the graph, the radiated electric field intensity increases along with an increase of the gap length in the case of each the electromagnetic waves having the frequencies 2.49 GHz, 9.95 GHz, and 39.81 GHz. When the gap length increases to be a certain value, the radiated electric field intensity is saturated.

According to FCC Standard Part 15, Subpart B, Class B (3 meter measurement method) as the EMI regulation in the U.S.A., a limit value of the radiated electric field intensity is indicated as 53.9 dBµV/m when average detection measurement from 1 Gbit/s to 40 Gbit/s is performed. Therefore, in this embodiment, a target upper limit value of the radiated electric field intensity is set to be 47.9 dBµV/m, and this value has a margin of 6 dB with respect to the above-mentioned limit value. In this case, in order to control the radiated electric field intensity to be the target upper limit value 47.9 dBµV/m or lower, it is necessary to set the gap length between the groove part 62 of the elastic covering member 3 and the opening parts 11 and 12 of the case 1 to be 2.5 mm or smaller for any of the frequencies. In other words, it is understood that if the gap length between the groove part 62 of the elastic covering member 3 and the opening parts 11 and 12 of the case 1 is set to be 2.5 mm or smaller, the radiated electric field intensity can be controlled to be the target upper limit value 47.9 dBµV/m or lower for any of the frequencies.

According to the optical transceiver described above, the conductive elastic covering member 3 for covering the projections 42a and 43a comes into intimate contact with the outer periphery of the conductive opening parts 11 and 12 of the case 1. Therefore, it is possible to shield the high-frequency electromagnetic wave emitted from the optical subassemblies 42 and 43 and the circuit components 41a to 41d mounted on the printed circuit board 40. In addition, the projections 42a and 43a come into contact with the conductive elastic covering member 3 having predetermined resistivity and are covered therewith, and hence noise current (noise magnetic field) itself generated in the projections 42a and 43a can be attenuated by heat consumption. Therefore, the EMI noise radiated from the pigtail part of the optical transceiver (the parts of the projections 42a and 43a protruding from the case 1) can be sufficiently suppressed.

In addition, it is not necessary to cover the projections 42a and 43a with a metal cap that contacts the upper case part 10 and the lower case part 20 or that is integral with the case 1. Therefore, a sufficient bending radius of the optical fiber 2 can be maintained even if the optical fiber 2 is pulled in a direction different from the insertion and withdrawal direction. For this reason, it is possible to prevent a breakage of the optical fiber 2 at an optical fiber through-hole or its vicinity, a breakage of a sheath of the optical fiber because of a contact between the optical fiber 2 and a metal cap, and other problems. Further, a metal cap, which typically has a complicated shape and which needs a number of assembling steps, is not necessary, and hence it is also possible to prevent an increase in manufacturing cost.

Note that the present invention is not limited to the embodiment described above.

For instance, the present invention can generally be applied to pigtail type optical transceivers including at least one of a light emitting device and a light receiving device.

In addition, the projection may have a shape other than the cylindrical shape and the combined shape of a plurality of cylinders. In addition, the elastic covering member for covering the projection is not necessarily made entirely of the same conductive elastic material as described in the above embodiment. It is sufficient that at least the outer circumference surface and the inner circumference surface of the elastic covering member are made of the conductive elastic material having predetermined resistivity.

While there have been described what are at present considered to be certain embodiments of the invention, it will be understood that various modifications may be made thereto, and it is intended that the appended claims cover all such modifications as may fall within the true spirit and scope of the invention.

What is claimed is:

1. An optical transceiver comprising:
   an optical sub assembly having a main body part for housing a semiconductor optoelectronic device and a projection which includes an optical coupler for optically coupling an optical fiber, inserted externally into the optical sub assembly projection, to the semiconductor optoelectronic device;
   a printed circuit board on which a circuit connected to the semiconductor optoelectronic device via a signal transmission line is mounted;
   a covering member covering the projection of the optical sub assembly;
   a conductive case housing the optical sub assembly and the printed circuit board, the conductive case having an opening part with an outer periphery and through which opening part the projection, covered by the covering member, passes from inside the case to outside the case;
   at least an outer circumference surface and an inner circumference surface of the covering member, said circumference surfaces being made of a conductive elastic material having a predetermined resistivity; and
   at least a part of the outer circumference surface of the covering member intimately contacting at least a part of an outer periphery of the opening part, and at least a part of the inner circumference surface of the covering member intimately contacting the projection.

2. An optical transceiver according to claim 1, wherein a surface of the projection is made of a metal.

3. An optical transceiver according to claim 1, wherein the conductive elastic material is a conductive rubber.

4. An optical transceiver according to claim 3, wherein volume resistivity of the conductive elastic material is 10 ohm·cm or lower.

5. An optical transceiver according to claim 3, wherein the conductive elastic material is a millable silicone rubber.

6. An optical transceiver according to claim 5, wherein the conductive elastic material contains conductive filler made of carbon black.

7. An optical transceiver according to claim 1, wherein a length of a part of the outer periphery of the opening part that does not contact the outer circumference surface of the covering member is no greater than 2.5 mm.

8. An optical transceiver according to claim 1, wherein a thickness of the covering member is at least 0.5 mm.

9. A projection covering member for covering a projection which includes an optical coupler of an optical transceiver comprising:
   an optical sub assembly having a main body part for housing a semiconductor optoelectronic device and the projection for optically coupling an optical fiber, inserted externally into the optical sub assembly, to the semiconductor optoelectronic device;
   a printed circuit board on which a circuit connected to the semiconductor optoelectronic device via a signal transmission line is mounted; and
   a conductive case for housing the optical sub assembly and the printed circuit board, the conductive case having an opening part with an outer periphery and through which opening part the projection passes from inside the case to outside the case;
   at least an outer circumference surface and an inner circumference surface of the projection covering member, said circumference surfaces being made of a conductive elastic material having a predetermined resistivity; and
   at least a part of the outer circumference surface of the covering member intimately contacting at least a part of an outer periphery of the opening part, and at least a part of the inner circumference surface of the covering member intimately contacting the projection.

10. A projection covering member according to claim 9, wherein a surface of the projection is made of a metal.

11. A projection covering member according to claim 9, wherein the conductive elastic material is a conductive rubber.

12. A projection covering member according to claim 11, wherein volume resistivity of the conductive elastic material is 10 ohm·cm or lower.

13. A projection covering member according to claim 11, wherein the conductive elastic material is a millable silicone rubber.

14. A projection covering member according to claim 13, wherein the conductive elastic material contains conductive filler made of carbon black.

15. A projection covering member according to claim 9, wherein a length of a part of the outer periphery of the opening part that does not contact with the outer circumference surface of the covering member is no greater than 2.5 mm.

16. A projection covering member according to claim 9, wherein a thickness of the covering member is at least 0.5 mm.

* * * * *

UNITED STATES PATENT AND TRADEMARK OFFICE
CERTIFICATE OF CORRECTION

| | |
|---|---|
| PATENT NO. | : 8,313,251 B2 |
| APPLICATION NO. | : 12/413793 |
| DATED | : November 20, 2012 |
| INVENTOR(S) | : F. Maeda et al. |

It is certified that error appears in the above-identified patent and that said Letters Patent is hereby corrected as shown below:

ON THE TITLE PAGE

Please correct Item (73) Assignee: to read as follows:

(73) Assignee: ~~Opnext Japan, Inc.~~ OCLARO JAPAN, INC., Kanagawa (JP)

Signed and Sealed this
Fourth Day of June, 2013

Teresa Stanek Rea
*Acting Director of the United States Patent and Trademark Office*